G. T. RUDE.
STAR FINDER AND IDENTIFIER.
APPLICATION FILED DEC. 30, 1920.

1,401,446.

Patented Dec. 27, 1921.
3 SHEETS—SHEET 1.

Gilbert T. Rude
INVENTOR.

BY

ATTORNEYS

G. T. RUDE.
STAR FINDER AND IDENTIFIER.
APPLICATION FILED DEC. 30, 1920.
1,401,446.
Patented Dec. 27, 1921.
3 SHEETS—SHEET 2.
Fig. 2.
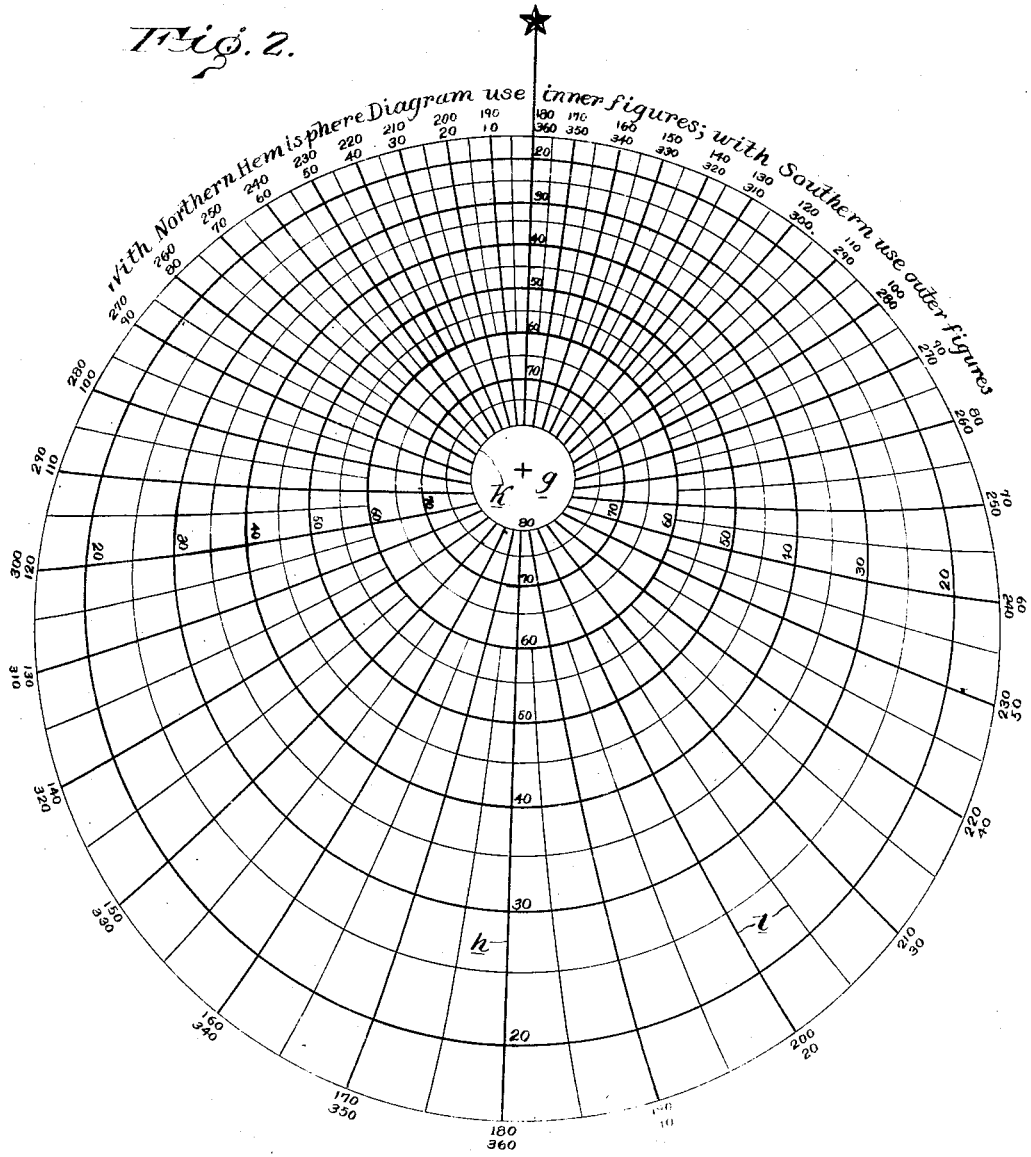
Gilbert T. Rude, INVENTOR.
BY
ATTORNEYS

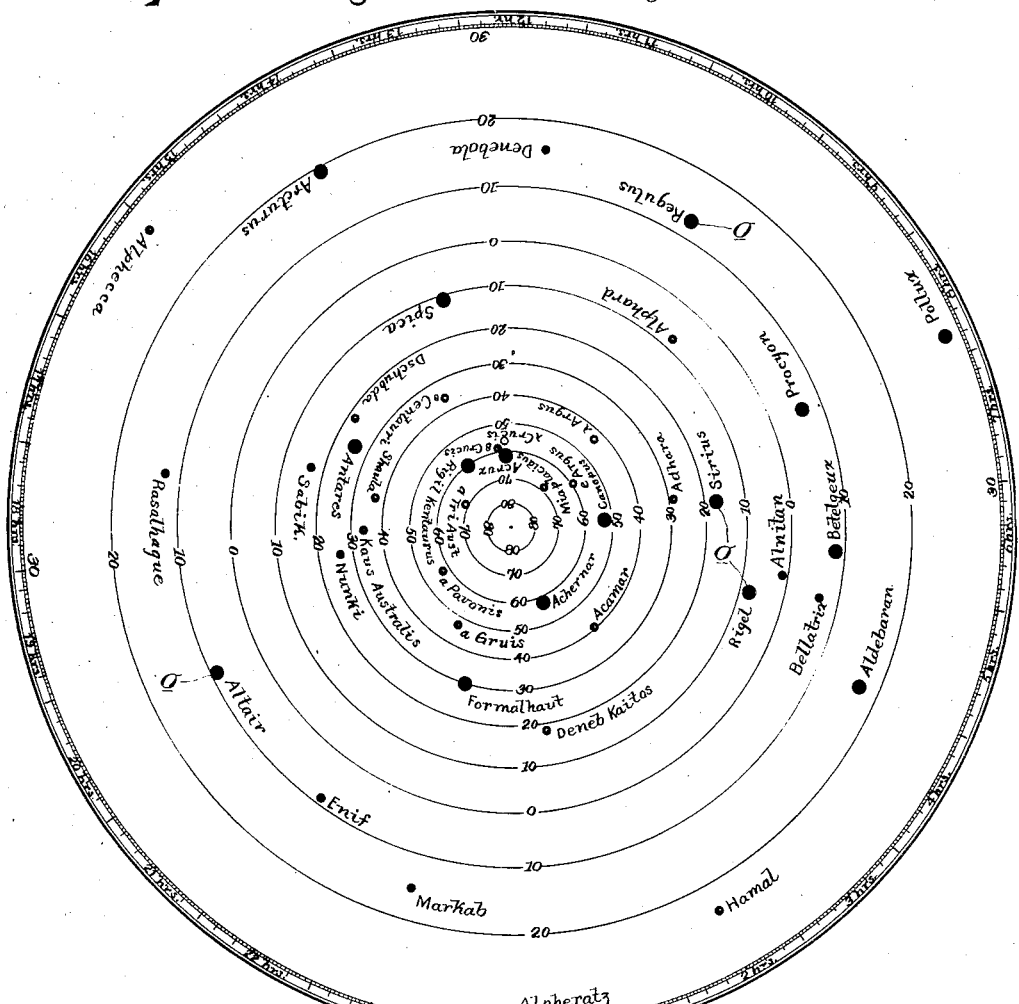

UNITED STATES PATENT OFFICE.

GILBERT T. RUDE, OF WASHINGTON, DISTRICT OF COLUMBIA.

STAR FINDER AND IDENTIFIER.

1,401,446.  Specification of Letters Patent.  Patented Dec. 27, 1921.

Application filed December 30, 1920. Serial No. 434,140.

*To all whom it may concern:*

Be it known that I, GILBERT T. RUDE, a citizen of the United States, residing at Washington, in the District of Columbia, have invented certain new and useful Improvements in Star Finders and Identifiers; and I do hereby declare the following to be a full, clear, and exact description of the invention, such as will enable others skilled in the art to which it appertains to make and use the same.

This invention relates to star finders such as are employed in finding navigation stars, from the observation of which, position is to be determined.

It is the object of the invention to provide means for quickly identifying navigation stars through the medium of their observed altitudes.

A further object of the invention is to provide means for determining where in the heavens an observable navigation star will appear at the future time favorable for observation.

Under the method ordinarily used, the observer depends upon the naked eye for initial location of the star upon which the observation is to be made, the field of the telescope being too small to permit of general search for the star through it. When the star becomes observable with the naked eye, a large percentage of the available time prior to disappearance of the horizon on account of darkness, has lapsed and it may happen that there is not sufficient time remaining to make complete and accurate observations. Particularly is this so when the weather is not clear, so that the stars appear only at intervals.

With the present equipment, the latitude being approximately known by dead reckoning, the altitudes and the azimuths of stars visible at that latitude, are determined. The sextant and the pelorus are then set accordingly and at the proper time the sextant is trained on the horizon across the pelorus, in accordance with data acquired with the present equipment and where the navigation star should approximately be brought to the horizon. The horizon is swept with the sextant over a small arc including the point indicated by the pelorus and when the star in question becomes visible, it will be reflected to the horizon and its location may then be accurately determined in terms of altitude by manipulation of sextant tangent screw in the usual manner.

After the diagram and templet hereinafter referred to, have been manipulated to determine the navigation stars to be visible at that latitude and at that approximate time, with their respective altitudes and azimuths, the pelorus is set for the azimuth and the sextant is set for the altitude of the star to be first observed. At the proper time, which with the present equipment is before the star would be discernible with the naked eye, an observation through the sextant is taken on the horizon across the pelorus for the star for which the instruments have been set. The observation is continued and at the instant the star is discernible, it will appear as on the horizon. By reason of this advanced determination of the approximate position of the star on the horizon, a wide sweeping of the horizon is obviated and on the contrary, it is only necessary to sweep the horizon through a very short arc. The retracing of this arc at small fractional time intervals, insures sighting of the star without that loss of time that would occur, were it necessary to sweep the horizon through a wide arc.

In the process of identification of a star, an observation is taken for altitude in the usual manner and knowing the course of the vessel, the general direction of the star is approximated and then, by association of the diagram and templet and with the altitude in mind, the star is identified on the diagram.

Further it is the object of the invention to provide an equipment with which may be determined at a glance and for any dead reckoning position, what stars and planets will be visible at twilight or dawn; the altitudes at any time and for any place of any of the navigation stars; the bearings of these stars and planets at any time and for any place and the identities of any of these stars and planets, the altitudes of which are observed and the bearings of which are estimated only approximately.

In the drawings:

Fig. 2 is a plan view showing one of the templets to be used in connection with the diagram illustrated.

Fig. 3 is a plan view of a movable planet marker.

Fig. 5 is a top plan view of a planet marker.

Fig. 6 is a section taken diametrically through a planet marker.

Figure 1:
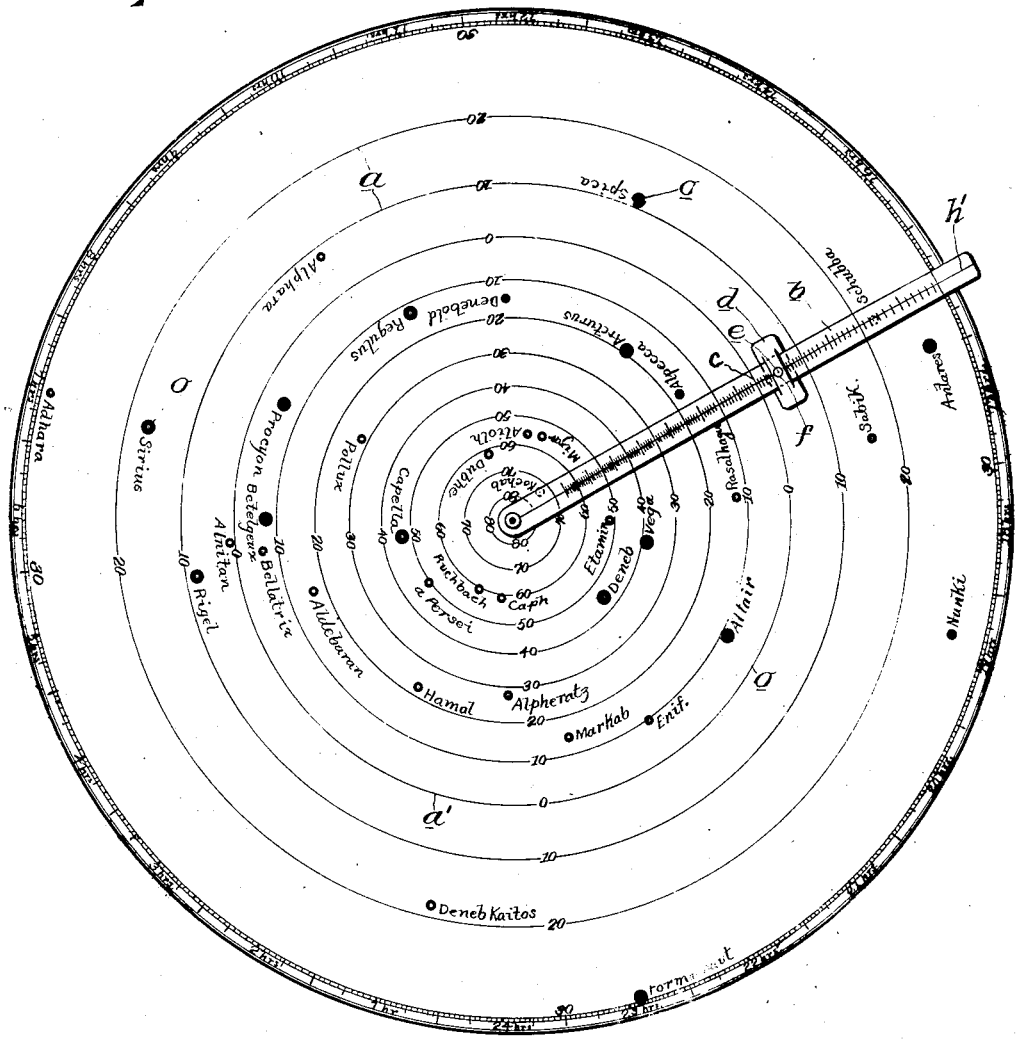
Figure 1 illustrates the diagram for the Northern Hemisphere and on which are located the corresponding navigation stars, there being also shown the scale arm that is shiftable to indicate the position of the zenith, together with the slide that is shiftable to show the proper positions for the various templets that correspond to different latitudes.
Figure 4:
Fig. 4 is a central section through the planet marker shown in Fig. 3.

Referring to the drawings, there is shown a diagram of the heavens, on which are positioned those navigation stars and planets that are used in navigating the Northern Hemisphere. It will be noted that this diagram includes a series of concentric circular lines $a$, the spacing of which gradually increases outwardly from the center. These lines indicate declination. The spaces between the series of lines are, as a matter of convenience, at intervals of 10°. The innermost circle is marked 80 and the succeeding circles are marked diminishingly with intervals of 10, to the zero line $a'$, beyond which the succeeding lines are marked increasingly with intervals of 10 to 30.

The common center of the circles represents the celestial north pole, while the zero line $a'$ serves as a line of demarcation between the stars and planets having north declination and those having south declination. Pivoted at the common center of the declination lines is a transparent arm $b$ having a transverse line $c$ marked thereon that coincides with the line $a'$ that indicates the celestial equator. The arm $b$ extends beyond the outermost declination line and in both directions from the line $c$, it is marked with a scale indicating degrees of declination north and south respectively. The lines of the scale that indicate the same number of degrees from the zero line $c$ as do the lines above and below the celestial equator, are correspondingly numbered.

In connection with the scale arm $b$ is employed a transparent slide $d$ having a point $e$ marked thereon and which, in the manipulation of the equipment, is brought into registration with the proper scale mark. For purpose of ready visualization of the point $e$, there is provided a circumscribing concentric circle $f$.

With the diagram prepared as far as explained, a point on the outer circular line is selected to indicate the vernal equinox and is marked "24 hours" as illustrated.

The outer circle is then divided angularly into twenty-four equal sections which, beginning with the first marking to the left, are numbered increasingly with intervals of one hour, as illustrated. The spaces between these major markings are subdivided to represent intervals of two minutes while these minor intervals are marked in groups of fifteen minutes as a matter of convenience in the use of the equipment.

With the diagram as thus constructed, there is then plotted upon its face the navigation stars which are placed at such angular distances from the vernal equinox as corresponds to the tabulated right ascension and being positioned that distance from the center of the diagram as will indicate the tabulated declination.

In connection with the diagram described, there is employed a series of transparent templets, constructed for absolute readings on longitudinal positions of any definite intervals of degrees, each templet, however, being capable of use in accurate estimation for a number in both directions from its absolute reading.

It has been elected to illustrate and describe the templet that gives an absolute reading at 45° north latitude and which may be shifted for readings with sufficient accuracy, above and below that point.

In preparation of the templet, a point $g$ is arbitrarily selected to indicate the zenith of the observer and through that point is drawn a straight line $h$ that indicates the observer's meridian from which are plotted the azimuth lines $i$ that originate at the point $g$ and which extend divergently therefrom. As a matter of convenience, the lines $i$ are made alternately heavy and light, the heavy lines being spaced apart 10° and each light line being intermediate a pair of heavy lines so that each light line is spaced 5° from the adjacent heavy lines. Furthermore, to avoid confusion of lines, the light lines terminate short of the zenith point $g$.

With the point $g$ as a center, it will be noted that the azimuth lines directly adjacent the line $h$ and below the center $g$ are spaced considerably farther apart than are those azimuth lines directly adjacent the line $h$ above the center $g$.

With a center slightly below the point $g$, there is described a circular altitude line $k$ and about this first circle are described other circles of gradually increasing radii and the centers of which are displaced downwardly from the point $g$ in the same direction with the line $h$. The innermost circle in the templet illustrated, is 10° from the center $g$ while the succeeding circles are spaced 5° apart. The innermost circle is marked 80 to designate the altitude indicated by it and the alternate succeeding circles are marked to show the degrees of altitude indicated by them, with intervals of 10°. To facilitate plotting, the circles thus marked are heavier than the unmarked intermediate circles. It will be noted that these altitude circles are continued to show a minimum altitude of 15°, which is the minimum altitude at which an accurate observation may be had, due to refraction.

The use of the present equipment is based on the dead reckoning latitude and longitude, reckoned from port if its use be in connection with the first observation made, or reckoned from the previous observation, if there be such.

Supposing the dead reckoning latitude to be 43°, the slide $d$ is moved on the scale arm $b$ until its point $e$ registers with the scale mark indicating the latitude of 43° and the scale arm is then pivotally swung until its longitudinal medium line which intersects its pivot, registers with the scale upon the outer circle of the diagram in indication of the local sidereal time for the time of subsequent observation.

There is then selected the templet prepared for absolute readings at a lititude of 45° and which as before stated, may be used for readings between latitudes 42° and 48°, north or south. The templet is then disposed with the point $g$ coincident with the point $e$ and with the observer's meridian $h$ coincident with the longitudinal median line $h'$ of the scale arm. All of the stars then covered by that part of the templet included within the outermost altitude circle, are the stars that may be observed from the latitude of 43° at the time set for the observation. Any one of these stars may be arbitrarily selected and by reference to the altitude and azimuth lines, both the altitude and azimuth of that star may be noted for the time of the subsequent observation. The pelorus is then set for the indicated azimuth, and the sextant is then set for the indicated altitude, at a convenient time near to the time for the observation. When the time for observation arrives, and which time for observations on the fixed stars is approximately fifteen minutes before they would be discernible with the naked eye, an observation is taken through the telescope of the sextant at the horizon across the pelorus. By reason of the close approximate known position of the star in question afforded by the use of the diagram and templet as described, a very slight manipulation of the sextant both for altitude and azimuth will include the field within which the star can possibly appear. This of course permits of retracing of the field at intervals of only a fraction of a second so that a minimum of time is lost in location of the star after it has become visible through the telescope. The observation on that particular star having been completed, the sextant and the pelorus are adjusted to correspond to the next star for which observation is to be made and this method is continued until the entire number of stars selected has been observed. From these observations, the position of the ship is plotted in the usual manner.

Conversely, and in identification of an observed star, its altitude is taken with a sextant in the usual manner and its bearing is roughly estimated by the eye from the course of the ship. Then with the templet applied to the diagram in the manner just explained, the altitude and azimuth lines of the templet corresponding to the reading of the sextant and the estimate of the bearing of the star, will locate the corresponding star on the diagram with its identity given.

It will be understood that the diagram illustrated and described is that prepared for the Northern Hemisphere and that the diagram for the Southern Hemisphere involves the same principles and shows the navigation stars used in the Southern Hemisphere.

Upon reference to Fig. 3 of the drawings it will be noted that the diagram for the Southern Hemisphere shows all of the stars of the Northern Hemisphere diagram that appear on the latter below 30° north declination. This is in order that as the zenith point of the observer represented by the point $e$ of the slide is shifted along the scale arm, the corresponding templet will embrace those stars visible at the corresponding latitude. By including in each diagram that area of the celestial dome observable from both the Northern and Southern Terrestial Hemispheres, it is not necessary when sailing in low latitudes to overlap the two diagrams at which time there is used a templet that will include stars of both the northern and southern diagrams. When navigating in a low latitude of the Northern Hemisphere it may be desired to make observations on stars so far south as to be located on the southern diagram. In that event, the same templet employed in connection with the Northern Hemisphere diagram, is manipulated in connection with the Southern Hemisphere diagram, in the same manner as described in connection with the Northern Hemisphere diagram, but the readings that were previously interpreted as north declination then indicate south declination.

The description thus far given of the equipment and its use, has reference to observations made on the navigation stars. In addition to fixed stars, observations are also made, when conditions of convenience dictate, on the planets Jupiter, Mars, Venus, and Saturn. The observations in plotting a position may be confined to these planets or may include both planets and stars.

Owing to the ever changing positions of the planets in the heavens, they may not be permanently indicated on the diagrams, but instead, their positions in the heavens must be plotted from time to time and their corresponding locations on the diagrams, be shown. For showing the positions of the planets, disks *o* of any suitable material may be attached to the diagrams temporarily by any suitable means. The method of plotting the positions of the planets and the frequency with which the plottings must be made in the interest of accuracy, are well known to those skilled in the art and need not be particularly described.

A planet marker is illustrated in Figs. 5 and 6 in which is illustrated a body 10 of any suitable metal, centrally of which is soldered or otherwise fixed a needle point 11 which when pressed into the diagram and its backing, will hold the marker against accidental displacement while permitting of ready removal of it when desired. On the opposite face of the body 10 from the needle point 11, is fixed a label 12 bearing the name of the planet indicated. It will of course be understood however, that these markers may be made as desired.

What is claimed is:

1. A star finder and identifier comprising a diagram having located thereon the celestial navigation bodies in their true correlative positions and a coöperative templet plotted in conformity with a definite degree of latitude and having dimensions to include the navigation celestial bodies visible at any one moment at that latitude, and means for locating the templet upon the diagram at any latitude within its limit of use and at the right ascension corresponding to the sidereal time of the observation, the templet being scaled to graphically show the altitudes and azimuths of the celestial bodies encompassed by it.

2. A star finder and identifier comprising a diagram having located thereon the celestial navigation bodies in their true correlative positions and a coöperative templet plotted in conformity with a definite degree of latitude and having dimensions to include the navigation celestial bodies visible at any one moment at that latitude, the templet being scaled to graphically show the altitudes and azimuths of the celestial bodies encompassed by it when correlated to the diagram.

3. A star finder and identifier comprising a diagram having located thereon the celestial navigation bodies in their true correlative positions, and having the polar zenith located on it and a concentric sidereal time scale, the diagram having an arm pivoted at the polar zenith and adapted to traverse the time scale, the arm having a latitude scale thereon and means for graphically indicating different points of the scale, and a coöperative transparent templet plotted in conformity with a definite degree of latitude and having dimensions to include all of the celestial bodies visible at any one moment at that latitude, the templet having indicated thereon the observer's zenith for registration with the means for graphically indicating a point of the latitude scale and having marked thereon the observer's meridian and being further constructed to graphically show the altitudes and azimuths of the navigation celestial bodies visible through it when correlated to the diagram as described.

In testimony whereof I affix my signature.

GILBERT T. RUDE.